United States Patent
Tennis

[11] 3,798,905
[45] Mar. 26, 1974

[54] POWER ASSISTED BRAKE CONTROL DEVICE

[75] Inventor: Francis H. Tennis, Oconomowoc, Wis.

[73] Assignee: Hydraulic Industries, Inc., Hartland, Wis.

[22] Filed: July 31, 1972

[21] Appl. No.: 276,851

Related U.S. Application Data
[63] Continuation-in-part of Ser. No. 93,169, Nov. 27, 1970.

[52] U.S. Cl............................ 60/555, 60/563, 60/582
[51] Int. Cl................................................. F15b 7/08
[58] Field of Search............ 60/54.5 P, 54.6 P, 555, 60/563, 582; 137/625.66, 85

[56] References Cited
UNITED STATES PATENTS

| | | | |
|---|---|---|---|
| 2,569,028 | 9/1951 | Stryler | 60/54.5 P |
| 3,220,318 | 11/1965 | McGuire | 137/625.66 |
| 3,260,273 | 7/1966 | Haynes | 137/85 |
| 2,904,960 | 9/1959 | Aikman | 60/54.6 P |
| 3,638,425 | 1/1972 | Maurice | 60/54.5 P |
| 2,931,389 | 4/1960 | Moog | 137/85 |
| 3,570,541 | 3/1971 | Franz | 137/625.66 |
| 3,349,800 | 10/1967 | Herion et al. | 137/625.66 |

FOREIGN PATENTS OR APPLICATIONS

| | | | |
|---|---|---|---|
| 990,046 | 4/1965 | Great Britain | 137/625.66 |
| 1,157,578 | 7/1969 | Great Britain | 137/85 |

Primary Examiner—Edgar W. Geoghegan
Assistant Examiner—Anthony M. Zupcic

[57] ABSTRACT

A hydraulic brake controller comprising a piston manually actuatable toward a first end of a master cylinder to expel pressure fluid therefrom to the brake line of a hydraulic brake mechanism and to also displace fluid into a first end of a control cylinder. Fluid thus entering the control cylinder effects hydraulic actuation of a valve plunger therein toward the second end of the control cylinder, to an open position allowing fluid from a source thereof under pressure to flow to the second end of the master cylinder and augment the force applied manually to the piston therein. The second ends of the cylinders are at all times communicated with one another; and the piston is at all times hydraulically linked to the brake actuating mechanism through the brake line so that the operator can accurately gauge the braking effort.

11 Claims, 4 Drawing Figures

INVENTOR
Francis H. Tennis
BY
Ira Milton Jones
ATTORNEY

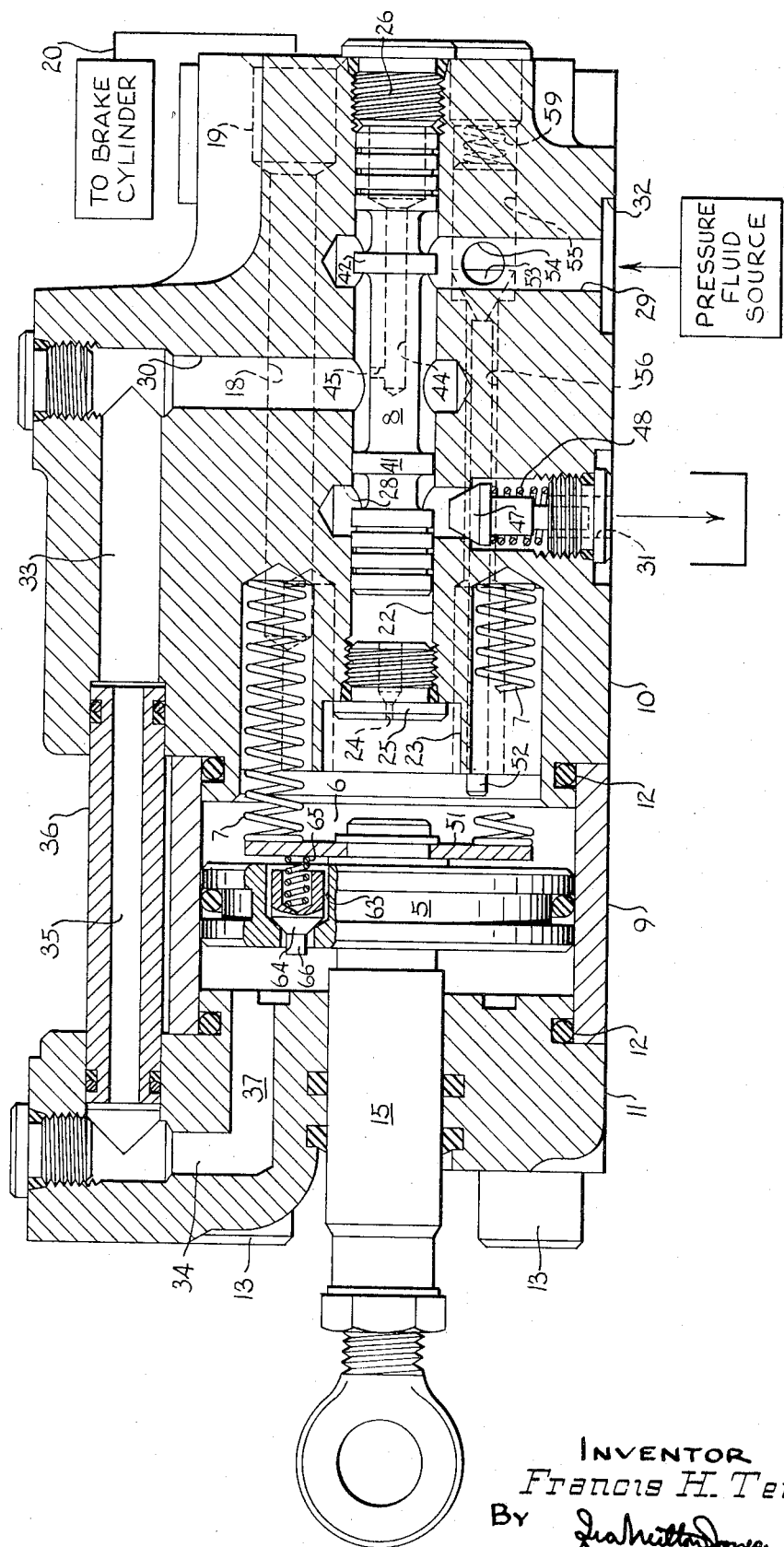

POWER ASSISTED BRAKE CONTROL DEVICE

This application is a continuation-in-part of Ser. No. 93,169, filed Nov. 27, 1970.

BACKGROUND OF THE INVENTION

This invention relates to hydraulic actuating devices generally, and it has more particular reference to improvements in manually operable power assisted control instrumentalities for hydraulic brake systems.

Heretofore, most power assisted hydraulic brake controlling instrumentalities failed to afford feed to the operator of anything approaching a true measure of the braking effort, Instead, the operator was only able to detect a spring force as a substitute for the actual hydraulic pressure obtaining in the brake line or lines.

Such spring equipped brake control instrumentalities also customarily embodied a pressure reducing type of valve which, upon sudden manual application of braking force, effected actuation of power cylinder by oil from an accumulator but only after a few micro seconds delay. When the brake shoes thereafter made contact with the brake drum, the pressure build-up was instantaneous and an objectionably violent engagement with little if any control was inevitable.

SUMMARY OF THE INVENTION

With the foregoing objections in mind, it is the main purpose of this invention to provide a power assisted hydraulic brake control instrumentality with manually operable actuating means that is at all times hydraulically linked to the brake line or lines so as to assure that an operator will be able to accurately feel the braking effort and to exercise complete control thereover.

More specifically, it is an object of this invention to provide a power assisted hydraulic break control instrumentality with a piston that is manually movable toward one end of a master cylinder to first set the brake and to then effect actuation of a power assist valve mechanism to provide for application of hydraulic power to the piston in the direction to increase the fluid pressure in the brake line.

With these observations and objectives in mind, the manner in which the invention achieves its purpose will be appreciated from the following description and the accompanying drawings which exemplify the invention, it being understood that such changes in the specific apparatus disclosed herein may be made as come within the scope of the appended claims.

The accompanying drawings, which are identical to those of my earlier application, Ser. No. 93,169, illustrate one complete example of the embodiment of the invention constructed according to the best mode so far devise for the practical application of the principles thereof, and in which:

FIG. 2 is a sectional view similar to FIG. 1 but showing the components of the instrumentality in an actuated condition;

Figure 1:
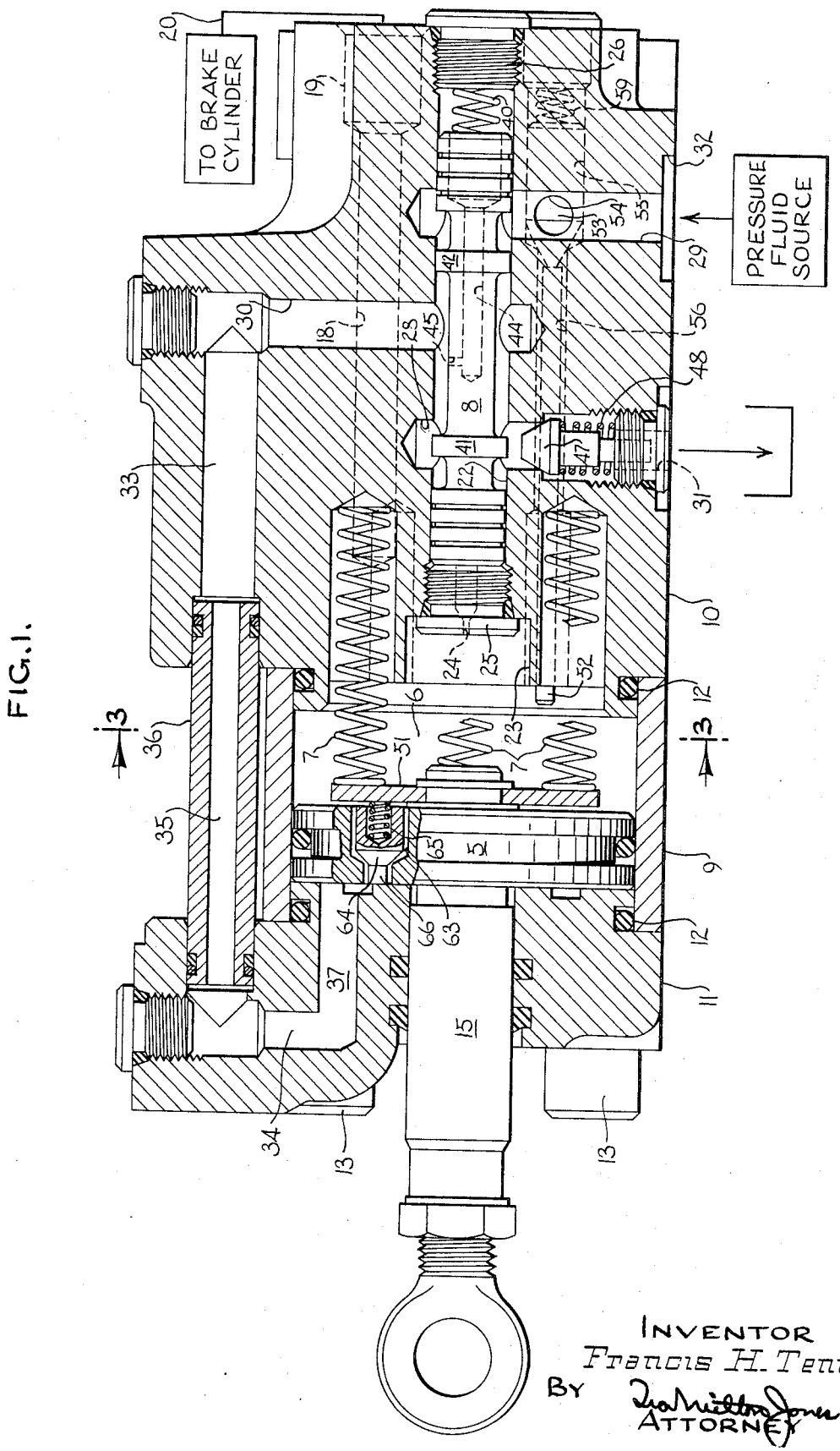
FIG. 1 is a longitudinal sectional view through a hydraulic brake control instrumentality of this invention.

Referring now more particularly to the accompanying drawings, the numeral 5 designates a piston which is reciprocable within a master cylinder 6, and is yieldingly urged by springs 7 to a forward position in the cylinder seen in FIG. 1. The piston is manually movable rearwardly into the cylinder, towards its inner end, to first effect setting of a brake, not shown, and to directly thereafter effect opening of a normally closed valve member 8.

In its open position (FIG. 2) the valve member allows pressure fluid from a source thereof to flow into the forward end of the cylinder and apply force to the piston, in the direction to increase the breaking effort.

The cylinder 6 is provided by a length of tubing 9 confined axially between a valve body 10 and a cap 11 and sealed with respect thereto by o-rings 12. A number of screws 13 hold the cap firmly in place on the front of the body. The body 10, cylinder 6 and cap 11 cooperate to provide a housing for the device of this invention.

A piston rod 15 connected to the piston projects forwardly through a bore in the cap for connection with a brake lever or pedal, not shown, to enable the piston to be manually actuated in the brake setting direction, against the force of the return springs 7 acting thereon. Hence, the piston rod provides manual actuating means for the brake control instrumentality of this invention.

Rearward actuation of the piston in the manner described effects pressurization of fluid in the inner end portion of the cylinder 6 and expulsion of such fluid out of the cylinder and into a service passage 18 which opens to the rear end of the cylinder and terminates in a service port 19 at the rear of the body. The service port provides for connection of a hydraulic brake line 20 to the controller of this invention.

The valve member 8 comprises an elongated cylindrical spool which is reciprocably received in a bore 22 in the body. While not essential, the bore has been shown as coaxial with the cylinder 6 and parallel to the service passage. The forward end of the bore opens to the inner end of the cylinder through a counterbore 23 and a restricted passage 24 in a plug 25 threaded into the bore. The rear end of the bore is closed by a plug 26.

Three passages 28, 29 and 30, perpendicular to the bore, intersect the same at axially spaced zones. The first passage 28 leads to a reservoir port 31 and is closest to the cylinder 6; the second passage 29 comprises an inlet passage which leads to an inlet port 32 and is farthest from the cylinder 6; and the third passage 30 opens to the bore at a zone midway between the junctions of the passages 28 and 29 with the bore. The passages 29 and 30 are part of a supply passageway that leads from the inlet 32 to the forward end of the cylinder 6 to provide for the introduction of pressure fluid to said outer end of the cylinder from an accumulator or other source of fluid under pressure, for power assist purposes.

In the position of the brake control instrumentality shown in FIGS. 1 and 2, the passage 30 extends upwardly to join with one end of a passage 33 that extends forwardly in the body to communicate with the upper leg 34 of an L shaped passage in the cap 13, through the bore 35 of a tube 36 suitably confined axially between the cap and the body. The lower leg 37 of the L shaped passage in the cap extends rearwardly from the leg 34 and opens into the front end of the cylinder 6, at the rod side of the piston therein.

It will thus be seen that the pressure fluid supply passage relied upon the power assist purposes is comprised of the passage 29, part of the bore 22, and connecting passages 30, 33, 35, 34 and 37.

The valve member 8 is normally yieldingly held in a foremost limit of motion in its bore 22, by means of a spring 40 confined between the rear end of the valve spool and the plug 26. This foremost limit of the spool is defined by the engagement of its front end with the adjacent plug 25.

Intermediate its ends, the valve spool is provided with three circumferential grooves that define a pair of substantially widely axially spaced lands 41 and 42. In the normal, or foremost, position of the spool, the forward land 41 is located far enough forwardly of the junction between the bore and passage 28 as to provide for communication between the reservoir port and the passage 30 through the center groove in the spool. Also, the rearward land 42 is located to block communication between the passages 29 and 30, so as to prevent flow of pressure fluid from the source thereof to the forward end of the cylinder 6.

The rearmost or full operating position of the valve spool is defined by its engagement with the plug 26. In that position, the spool land 41 closes off communication between the passage 30 and the reservoir passages 28, and the land 42 is far enough to the rear of the inlet passage 29 as to communicate the latter with supply passage 30 through the center groove of the spool.

The bore 22 can be considered as a control cylinder, and the valve spool as 2 plunger that is hydraulically actuatable from its normal closed position seen in FIG. 1, to its rearmost of fully open position seen in FIG. 2. Such hydraulic actuation of the spool is achieved as a consequence of rearward actuation of the piston 5 in cylinder 6, to expel pressure fluid into the service passage 18 and brake line 20. At this time, the piston also effects expulsion of pressure fluid from the cylinder through the restricted passage 24 in plug 25, to the pressure chamber provided by the forward end of the bore 22. The pressure fluid thus entering the bore 22 forces the valve spool rearwardly to an open position communicating the supply passage 30 with the pressure fluid inlet passage 29, so that pressure fluid can then flow to the cylinder 6 and exert a power assist force on the rod side of the piston to aid the operator in application of force to the brake mechanism.

An important feature of this invention resides in the fact that both the piston 5, and the actuator provided by its piston rod 15, are always directly hydraulically linked with the brake line. This is to say that the operator will always be subjected to the feel of the pressure in the brake line and will accordingly be able to sense and accurately control the braking effort.

Moreover, the ultimate in control over the braking effort is assured by reason of the fact that the rear end of the bore 22 in which the valve spool operates is maintained at the pressure which exists in the forward end of the cylinder 6. For that purpose, the valve spool is provided with an axial passage 44 which opens through a radial hole 45 to the central groove in the spool and to the rear of the spool so as to be in communication with the pressure chamber provided by the rear end of bore 22. Because of the location of the radial hole 45, the rear chamber of bore 22 is at all times in communication with the passage 30, and hence with the front end of the cylinder.

If desired, a low pressure relief valve 47 can be installed in the valve body to control communication between passage 30 and the reservoir port 31. The relief valve 47 is lightly biased by a spring 48 toward a position closing the return passage 28, and it opens as soon as the pressure of fluid expelled from the front end of culinder 6 under the force of the return springs acting on the piston 5, rises to a value in passage 28 great enough to overcome the relatively light biasing force of spring 48.

The brake control instrumentality operates in a manner which will now be described. The operator forces the piston rod 15 rearwardly to effect motion of piston 5 toward the inner end of its cylinder 6. As the piston moves rearwardly under manually applied force, it pressurizes the fluid in the inner end of the cylinder and expels such fluid to the service passage 18, for flow to the brake cylinder. Hence, the brake is initially manually actuated. Directly after the brake has been set in this fashion, the pressure fluid forced into the forward end of bore 22 through the orifice 24 will have reached a pressure therein exceeding the force of spring 40 acting on the valve spool, and the spool will be moved thereby rearwardly far enough to "open the valve" and establish communication between the pressure fluid inlet and the front end of the cylinder 6. Pressure fluid from the source thus acts upon the rod side of the piston to achieve the power assist feature of this invention.

The extent to which the valve member opens will depend upon the pressure produced in the rear of the master cylinder 6, and hence upon the amount of force which the operator applies manually to the piston rod 15. Thus, if the operator applies a moderately heavy force to the piston 5, for example, the valve spool 8 will be moved rearwardly to an open position that may be somewhat short of the fully open position thereof seen in FIG. 2.

This results from the fact that the land 42 on the rearwardly moving spool will increase the extent of communication between the pressure fluid inlet passage and the supply passage branch 30 until the forces acting on the opposite ends of the valve spool reach a balance. When that balanced condition is reached, the valve spool will remain in a stable partly open power boost position, until the force exerted on the piston 5 by the operator is either increased or decreased. The spool will shift farther to the rear if the manual force on the piston is increased, to effect a greater power boost; and it will shift forwardly in accordance with decrease in the manual force on the piston, to effect a corresponding decrease in the extent of the power assist.

Another important feature of the control instrumentality of this invention resides in the facility with which it and a brake cylinder governed thereby can be initially charged with oil. This is accomplished by movement of the piston 5 to its innermost position in the master cylinder 6, at which a rear plate 51 on the piston engages and pushes a valve actuating rod 52 rearwardly the distance required to unseat a poppet valve 53. Such unseating of the poppet valve 53 establishes a path for fluid at full accumulator pressure to flow from the inlet passage 29 to the inner end portion of the master cylinder and hence to the service passage 18, the brake line 20, and the brake cylinder to which it connects. This flow path comprises a lateral branch 54 of the inlet passage 29, a cylindrical valve chamber 55 containing the poppet valve 53 and disposed on an axis parallel to that of the valve spool 8, and an elongated bore 56 containing the poppet actuating rod 52 and communicating the valve chamber 55 with the inner end of the cylinder 6.

Figure 4:
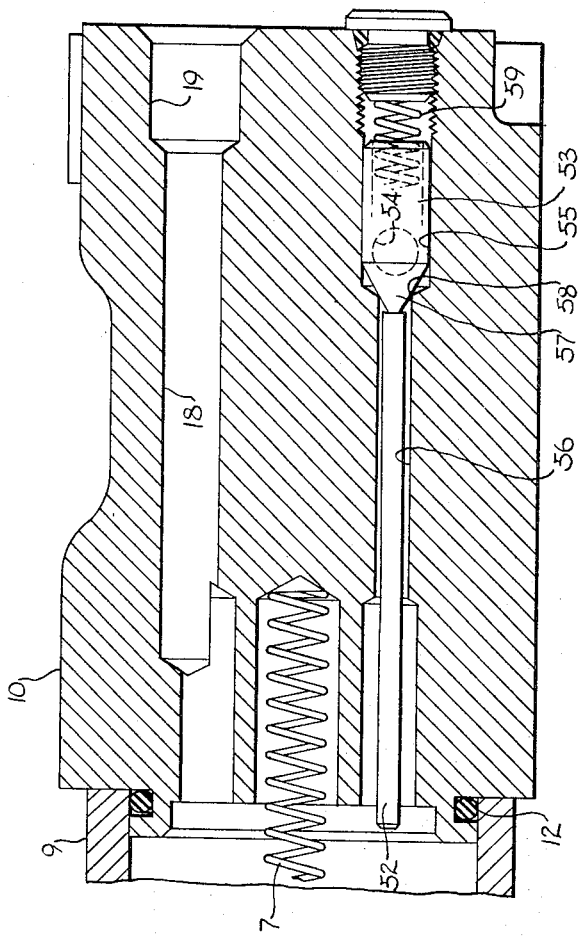
FIG. 4 is a sectional view taken on the line 4—4 in FIG. 3.

Referring to FIG. 4, it will be seen that the poppet valve 58 has a forwardly convergent nose 57 which extends through a rearwardly facing seat 58 for the valve and into the rear of the bore 56 for the valve actuating rod 52. A spring 59 yieldingly holds the poppet valve seated.

Figure 3:
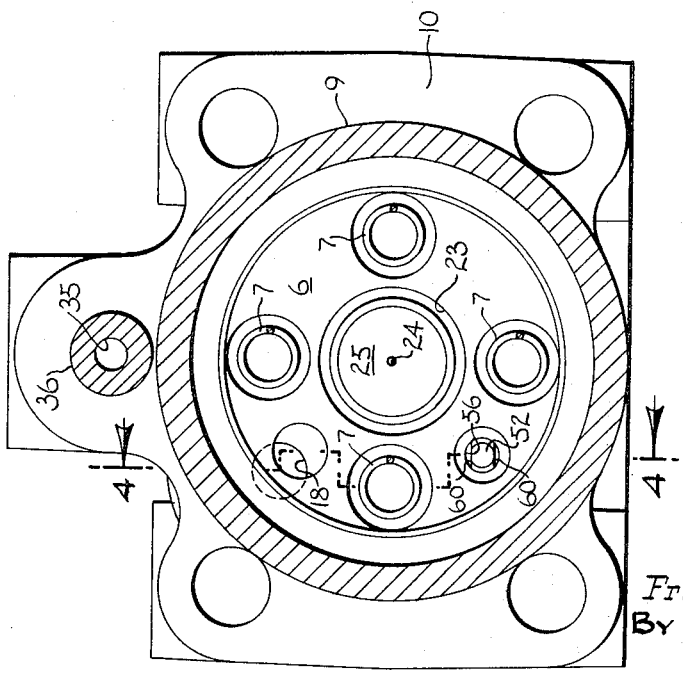
FIG. 3 is a cross sectional view taken on the line 3—3 in FIG. 1.

It should be noted that the valve actuating rod has flat sides 60, as seen best in FIG. 3, to enable pressurized supply fluid from the inlet passage 29 to flow around the rod, through the bore 56, to the master cylinder.

It should also be observed that when the piston is moved to its rearward limit to effect unseating of the poppet valve 53 and charging of the system in the manner described, pressure fluid flowing into the inner end of the master cylinder 6 will also pass though the orifice 24 and flow into the pressure chamber provided by the forward end of the bore 22, to force the valve spool 8 to its open position. This allows pressure fluid to flow from inlet passage 29 through the passageway comprised of passages 30, 33, 35, 34, 37 to the forward end of the master cylinder 6. It is understood, of course, that a bleed port in the system, most likely in the brake cylinder itself, must be held open while the system is being charged with fluid.

The rod actuated poppet 53 described above also serves as a safety device in two different ways. First, if for any reason a full stroke of the piston 5 fails to develop sufficient braking pressure in the brake cylinder (not shown) the piston acts on rod 52 to cause unseating of the poppet valve 53 to thereby communicate the service passage 18 and brake line 20 with the accumulator. This makes full accumulator pressure available for actuation of the brake cylinder.

However, if an excessively high pressure is produced in the main cylinder by piston 5, such pressure acts upon that surface of the poppet valve 53 which adjoins the actuating rod 52 therefor, and causes the poppet to be unseated, against the force of its spring 40. Consequently, any fluid at excessive pressure in the inner end of the power cylinder is dissipated to the accumulator. The poppet valve 53 thus serves as a high pressure relief valve under these circumstances.

Release of the brake, and also purging of all the air out of the brake system is also facilitated by the provision of an axial bypass 63 in the piston 5, communicating the opposite axial ends of the cylinder 6, and a small check valve 64 that governs flow through the bypass. A spring 65 confined between the rear plate 51 on the piston and the check valve 64 tends to hold the latter in a seated position such as seen in FIG. 2, closing the bypass. However, the check valve has an extension 66 thereon which projects forwardly through the bypass and engages the underside of the cap 11 when the piston is in its retracted position (FIG. 1) to hold the check valve unseated.

During charging of the system with brake fluid, the operator allows the fluid entering the inner end of the master cylinder 6 to push the piston forwardly toward its retracted position. After both ends of the cylinder have been filled, he can pump the piston a few times to expel all the air through the bleed port, and the system is then properly operative.

From the foregoing description, together with the accompanying drawings, it will be apparent to those skilled in the art that this invention provides a power assisted hydraulic brake controller which for the first time assures that the operator will be able to accurately feel the braking effort; and which not only incorporates unusual safety features, but also provides for charging a brake system with fluid in the most facile manner.

It will also be apparent that this invention has utility for purposes other than brake control. It provides an excellent servo mechanism which is ideally suited for use wherever an operator is required to exert manual control over the hydraulic cylinder or other work performing prime mover employed to drive the cutting element of a machine tool, for example.

The valve member 8 has been illustrated as one especially suited for use where the source of pressure fluid for power assist purposes is an accumulator. However, it will be obvious to those skilled in the art that whenever the source of pressure fluid is provided by a pump, the valve member 8 can be replaced by an open center type of valve element, in which the land 42 has been eliminated. In that case, pump output fluid would circulate freely, at low pressure from the inlet 29 forwardly through the bore 22 and discharge therefrom through the reservoir port 31 in the normal position of the valve member 8. Such open center flow, of course, would take place in bypass relation to the brake 30 of the supply passageway, and pressure fluid would not be compelled to flow to the master cylinder until the valve member 8 was moved to an operative position at which its land 41 closed off communication between the inlet 29 and the reservoir port 31. Hence, the operative position of the open center valve member 3 described could be said to be that in which the land 41 occupied a position between the reservoir port 31 and the branch 30 of the supply passage.

Those skilled in the art will appreciate that the invention can also be embodied in forms other than as herein disclosed for purposes of illustration.

The invention is defined by the following claims:

1. A power assisted hydraulic actuating device, characterized by:
    A. a main cylinder having first and second ends;
    B. a service port communicating with said first end of the main cylinder;
    C. a piston in the main cylinder manually movable toward said first end thereof to expel fluid under pressure to the service port;
    D. a control cylinder having first and second ends;
    E. inlet, outlet and supply passages respectively opening laterally to the control cylinder at three locations spaced axially from one another and from said ends of the control cylinder, said supply passage connecting with said second end of the main cylinder;
    F. a fluid pressure responsive valve spool in the control cylinder axially slidable from an inactive position adjacent to said first end of the control cylinder to an active position displaced toward said second end of the control cylinder;
    G. a spring acting on the spool to yieldingly resist such displacement thereof out of its inactive position;

H. means on the spool operable in its said inactive position to close off the inlet passage from the supply and outlet passages;

I. other means on the spool operable as a consequence of movement thereof to an active position to close off the supp;y passage from the outlet passage;

J. passage defining means on the spool operable in its said inactive position to communicate the supply and outlet passages, and effective in the active position of the spool to communicate the supply and inlet passages and cause the pressure in the supply passage to increase in accordance with the extent of spool movement toward said second end of the control cylinder;

K. means providing a first passageway communicating said first ends of the main and control cylinders whereby the spool will be hydraulically actuated toward an active position by flow of fluid through said first passageway from the main cylinder as a result of piston movement toward said first end of the main cylinder;

L. and means providing a second passageway at all times communicating the supply passage with said second end of the control cylinder, whereby such hydraulic actuation of the spool toward its active position will be opposed by pressure of fluid in said second end of the control cylinder of a magnitude depending upon the pressure of fluid in the supply passage.

2. The power assisted hydraulic actuating device of claim 1, further characterized by a low pressure relief valve governing fluid flow through the outlet passage.

3. The power assisted hydraulic actuating device of claim 1, further characterized by a housing for the device comprising:
A. a valve body having said control cylinder and valve spool therein;
B. a cap fixed to the body, in spaced relation thereto;
C. and a length of rigid tubing sealingly confined between the cap and said end of the body and providing said main cylinder.

4. Th power assisted hydraulic actuating device of claim 3, wherein a portion of said supply passage is comprised of a rigid tube connected axially between the body and cap and extending lengthwise along the exterior of the main cylinder.

5. The power assisted hydraulic actuating device of claim 3, wherein said cylinders are coaxial, and the piston has a rod affixed thereto and extending therefrom through a bore in the cap to the exterior of the housing.

6. The power assisted hydraulic actuating device of claim 5, further characterized by a number of wells in the body grouped around said bore therein and opening to the main cylinder; and a spring confined in each well and projecting therefrom into engagement with the piston to yielding resist movement thereof in its pressure applying stroke.

7. The power assisted hydraulic actuating device of claim 1, further characterized by:
A. said first end of the control cylinder opening to said first end of the main cylinder;
B. and a plug threaded into said first end of the control cylinder and having a hole therein providing said passageway.

8. The power assisted hydraulic actuating device of claim 1, further characterized by:
A. said piston having a hole therethrough a distance to one side of its axis, through which said first end of the main cylinder and the service port can be vented to the outlet passage via the supply passage in said inactive position of the valve spool;
B. a check valve for said hole spring urged toward a piston closing the same;
C. and means on the check valve engageable with said second end of the main cylinder to effect opening of the check valve in consequence of movement of the piston toward a retracted position adjacent to said second end of its cylinder.

9. A hydraulic actuating device, characterized by:
A. means defining a cylinder having a service outlet at one end and a pressure fluid inlet at its other end;
B. a piston in the cylinder movable toward said one end thereof to pressurize the fluid therein and to effect expulsion of fluid from the cylinder to the service outlet;
C. means connected with the piston to provide for actuation thereof toward said one end of the cylinder;
D. means providing a supply passageway connecting with the cylinder inlet and through which pressure fluid from a source can flow into the other end of the cylinder;
E. A valve member which governs flow through said passageway and which must be moved from an inoperative position to an operative position before pressure fluid from the source can flow to the cylinder;
F. means subjected to the elevated pressure produced in said end of the cylinder as a result of said actuation of the piston for effecting movement of the valve member to its said operative position;
G. means providing another supply passage by which said one end of the cylinder can be communicated with a pressure fluid source;
H. a valve element normally closing said other supply passage;
I. and means actuated by the piston as it nears said one end of the cylinder for effecting opening of said valve element.

10. A hydraulic actuating device having a piston movable toward one end of a power cylinder to expel fluid out of a service port, characterized by:
A. means providing an inlet for pressure fluid from a source;
B. means providing a supply passageway through which pressure fluid can flow into the other end of the cylinder;
C. a valve member movable from a normally inoperative position to an operative position providing for flow of pressure fluid from the inlet into said supply passageway; D. means for effecting actuation of said valve member to its operative position in consequence of movement of the piston toward said one end of the power cylinder;
E. and valve means actuatable in consequence of movement of the piston to a position adjacent to said one of the power cylinder for communicating the service port with the inlet.

11. A hydraulic actuating device having a power cylinder with a service port at one end, an inlet at its other end, and a piston in the cylinder movable toward said one end thereof to expel fluid out of the service port, characterized by:
  A. means providing an inlet passage which is connectable with a source of pressure fluid such as an accumulator;
  B. means providing a first supply passage which leads into said other end of the cylinder;
  C. means providing a second supply passage which leads to said service port through said one end of the power cylinder;
  D. first valve means governing communication of said first supply passage with the inlet passage, said valve means being movable out of a normal position before inlet fluid can flow to the supply passage;
  E. means for effecting actuation of said first valve means out of its said normal position in consequence of piston produced pressure in said one end of the power cylinder;
  F. second valve means governing flow of pressure fluid from the inlet passage to said service port via said second supply passage, said second valve means being spring urged toward a closed position but being adapted to open in response to piston produced abnormally high pressure in said one end of the power cylinder to relieve such abnormal pressure to the accumulator;
  G. and a rod actuatable by the piston as it nears said one end of the power cylinder for pushing said second valve means to open position.

* * * * *